Dec. 11, 1923.   1,476,761
J. M. MacLACHLAN
METHOD OF DRYING GRAPES AND OTHER FRUIT
Filed July 13, 1922   2 Sheets-Sheet 2
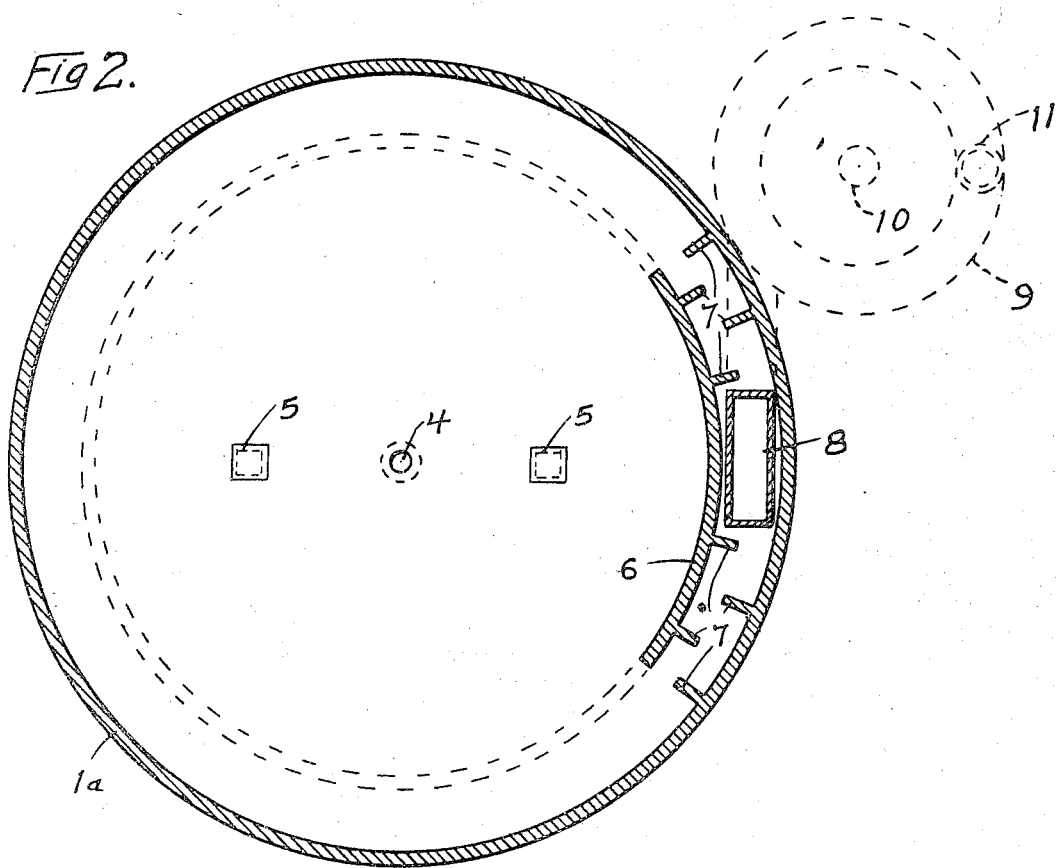
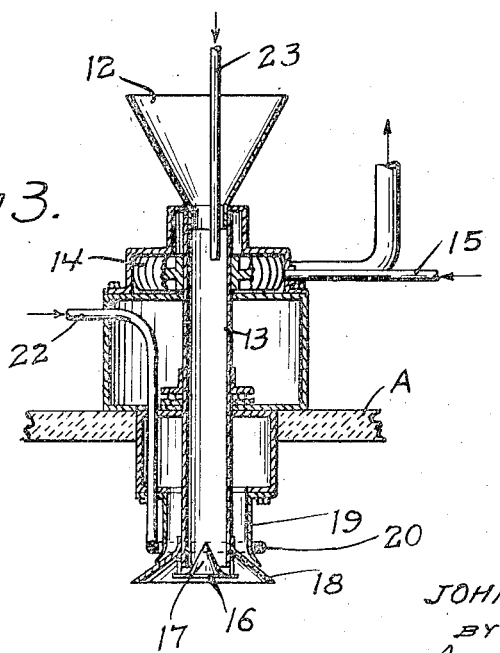
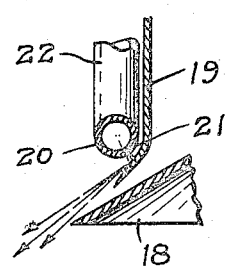
INVENTOR
JOHN M. MAC LACHLAN
BY HIS ATTORNEYS
James F. Williamson Patented Dec. 11, 1923.

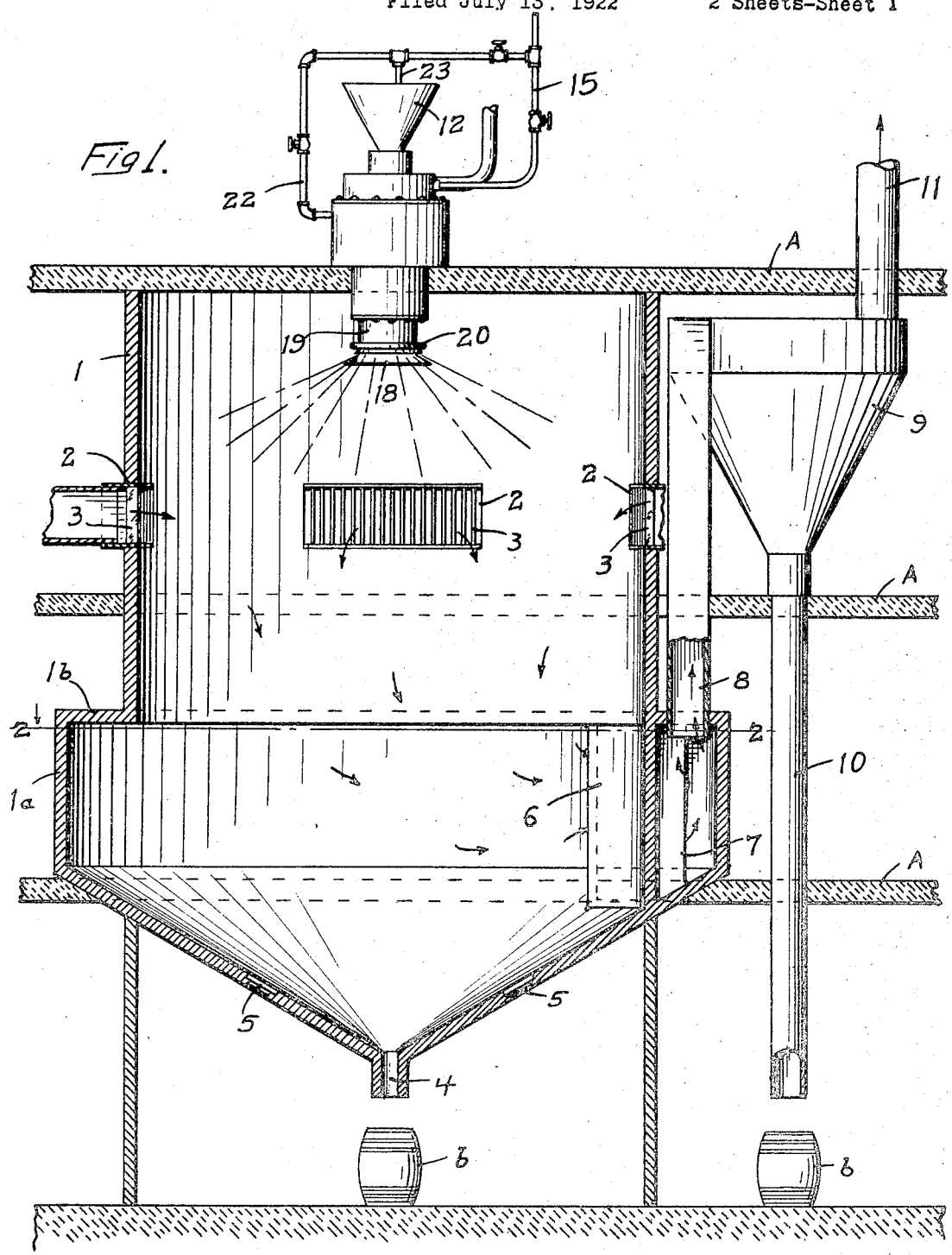

1,476,761

UNITED STATES PATENT OFFICE.

JOHN M. MacLACHLAN, OF MILWAUKEE, WISCONSIN.

METHOD OF DRYING GRAPES AND OTHER FRUIT.

Application filed July 13, 1922. Serial No. 574,792.

*To all whom it may concern:*

Be it known that I, JOHN M. MACLACHLAN, a citizen of the United States, residing at Milwaukee, in the county of Milwaukee and State of Wisconsin, have invented certain new and useful Improvements in Methods of Drying Grapes and Other Fruit; and I do hereby declare the following to be a full, clear, and exact description of the invention, such as will enable others skilled in the art to which it appertains to make and use the same.

This invention relates to the method of drying fruit, and particularly to the method of drying grapes. Grapes and other fruit have heretofore been dried, but the drying has usually been performed in slow stages so that the flavor and character of the fruit is entirely changed and the original flavor of the fresh fruit is not retained and cannot be restored. Since the adoption of the eighteenth amendment to the Constitution, large quantities of grapes that were heretofore used in making wine have to be marketed as other products and the process of the present invention is designed to utilize and facilitate the market of a large number of such grapes.

It is an object of this invention to produce a product from fruits, particularly grapes, consisting of a dry powdered material, which material, at any time subsequent to its production, can be mixed with water to produce a pulp or juice having all the flavor and properties of the original fresh fruit.

It is a further object of the invention to produce such a dry powdered material by grinding the fruit and then spraying and separating the same into minute particles and rapidly drying said separated particles.

These and other objects and advantages of the invention will more fully appear from the following description made in connection with the accompanying drawings illustrating a form of apparatus by which the process may be carried out and in which, Fig. 1 is a view in vertical section through the apparatus;

Fig. 2 is a horizontal section taken substantially on the line 2—2 of Fig. 1, as indicated by the arrows;

Fig. 3 is a vertical section of a portion of the apparatus shown on an enlarged scale; and Fig. 4 is a fragmentary vertical section of a portion of the apparatus shown in Fig. 3 on a more enlarged scale.

In carrying out the process, fresh ripe grapes are first treated to remove the seeds therefrom. This operation can be performed by using any of the well known seeding machines, comprising a rotating screen cylinder, or the seeds may be separated from the grapes by gravity and washing process.

After the seeds have been separated from the grapes, the pulp of the grapes, together with the hulls or skins and the matter adhering to the latter are ground very fine to give an exceedingly fine pulp. This grinding process can be carried out in any of the well known disk grinding machines or in the cylinder and concave type of machine. The fluid or pulpy consistency of the crushed fruit will materially assist in securing a finely ground product.

After the fruit or grapes has been ground, the fine pulp is in the form of a thick liquid and the same is treated in the apparatus shown in the drawings, which apparatus will now be described.

Referring to the drawings, a drying cabinet comprising the walls 1 is illustrated, which cabinet is preferable cylindrical. This cabinet is of considerable height and, as illustrated, is adapted to occupy the space between several floors A of a building. Somewhat adjacent its top, the cabinet is provided with spaced openings 2 extending for a short distance circumferentially about the wall, which openings are provided with spaced vertical shutters 3, preferably adjustably mounted to be set at different inclinations. The lower part of the cabinet is enlarged, as shown at 1ᵃ and the cabinet terminates in a conical base having a central discharge outlet 4, the bottom of said base being provided with spaced man-holes 5 forming means for entry into the cabinet. Adjacent one side of the cabinet, a partition 6 of semi-cylindrical shape extends downwardly substantially in alinement with the wall 1 to the base of the cabinet and in the space between this partition and the outer wall 1ᵃ are disposed a plurality of baffle plates 7 projecting into the space from the partition and the wall 1ᵃ, these baffle plates preferably being in staggered relation. The projecting wall 1ᵃ forms a ledge or horizontal projection 1ᵇ in the cabinet and at a point substantially centrally of the partition 7 an outlet conduit 8 extends upwardly from the horizontal portion 1ᵇ and is connected to and communicates with a cyclone separating device 9 formed as a downwardly converging cone having a central discharge conduit 10. An outlet conduit 11 for the air or gas from the separator is also shown. This cyclone separator is of any well known type of such apparatus and need not be further described.

The material to be dried will be contained in a vat or other suitable means and regularly fed into a funnel 12 secured to the upper end of a rotary tube 13 carried in suitable bearings located and supported on the upper floor A. This tube is adapted to be rotated at high speed and for this purpose, has connected thereto the rotor of a steam turbine 14 to which steam is supplied through a steam pipe 15 which will be connected with any suitable source of steam supply. The tube 13, at its bottom end, carries a distributing plate 16 having thereon an upwardly projecting cone 17, the pointed end of which projects upwardly into the bottom of tube 13. Secured to the lower end of the tube and surrounding the plate 16 is a disk 18 concave on its lower side. An annular shield 19 depends from a suitable bracket and has its lower edge somewhat sharpened and flaring outwardly above and adjacent the outer edge of the disk 18 and an annular steam pipe 20 extends about this shield 19 adjacent its lower flaring edge. This pipe 20 is provided with a large number of small holes 21, as shown in Fig. 4, through which steam is adapted to be projected against the flaring portion of the shield 19 and thence deflected outwardly and downwardly about the edge of the disk 18. Steam is supplied to the pipe 20 through the pipe 22 which will also be connected to any suitable source of steam supply. Another steam pipe 23 is, likewise, connected to a steam supply and extends downwardly through the hopper 12 and a short distance into the tube 13.

In operation, the finely ground pulp of the fruit will be regularly fed into the hopper 12 and will pass downwardly through the tube 13 which will be rotated at very high speed by the turbine 14. The material will strike the cone 17 and will be sprayed upon the plate 16 from whence it will be thrown outwardly with great force against the disk 18. The material will be sprayed upon the latter disk and projected radially outwardly and downwardly therefrom in an umbrella-like shower and in a thin film. It has been found in experiments that the rapidly rotating tube 13 tends to draw air upwardly therethrough which appreciably impedes the progress of the material through said tube. In order to overcome the tendency of the material to become clogged or stopped, the pipe 23 is provided through which a blast of steam is projected downwardly through said tube. This keeps the material moving therethrough in a uniform stream. The various steam pipes 15, 22 and 23, will be provided with suitable controlling valves, as shown in Fig. 1.

Steam, preferably superheated, will be introduced through the steam pipe 22 and this steam will issue in a multitude of small jets from the pipe 20 against the flaring edge of the shield 19 from which it will be deflected outwardly in a substantial continuous spray or film around the edge of the disk 18. This film or shower of highly heated steam will pass through the projected film of material and will act to efficiently scatter the same and also to break up or disintegrate and separate the particles of such material. Heated air will be continuously introduced under suitable pressure through the opening 3 into the cabinet. The projected material will fall through the heated air and will be rapidly dried so that by the time it reaches the bottom of the cabinet it will be in the form of a fine dry flour-like powder. A rotating action of the air results from the centrifugal rotating distributer and the introduction of air into the cabinet, and some of the finer material will be held in suspension in this air current. The outlet for the air, as described is between the partitions 7 and the wall 1ᵃ and the air in passing outwardly encounters the baffles 7 so that some of the material carried thereby will be precipitated. The air issuing from the cabinet passes through the conduit 8 and is preferably passed through the cyclone separator 9 where practically all of the suspended material is separated therefrom. The dry material falling to the bottom of the cabinet will be discharged through the outlet 4 and received in suitable barrels or receptacles $b$ and the material discharged from the cyclone separator through the conduit 10 will, likewise, be received in similar barrels $b$.

As stated, the minute particles separated in the spray and by the blast of the dry superheated steam will be dried in transit through the hot drying medium or air contained in the cabinet 1.

The dry powdered material formed can be used for making grape juice or for pastry, desserts and other culinary products. If the powder is used for grape juice and a clear juice is desired it may be necessary to strain the mixture of the water and powder. When the powder is thus mixed with water to form grape juice or to form a thicker pulp for other uses the original flavor of the fresh grape is restored and it is impossible to tell that the products are made from a dried material.

The dried grape powder in being shipped is contained in waterproof containers. This is necessary owing to the large sugar content of the product. If the same becomes moist the powder tends to form in lumps. Such lumps, however, do not in any way have an injurious effect on the powder and readily pass into solution when the same is mixed with water.

From the above description it is seen that applicant has provided a novel and efficient method for drying and preserving fruits. The fruit powder is capable of many uses and can be marketed and shipped in much more convenient form and in much less volume than the liquid products made from the fruit.

It will, of course, be understood that various changes may be made in the steps of the process and the sequence thereof without departing from the scope of applicant's invention, which, generally stated, consists in the matter shown and described and set forth in the appended claims.

What is claimed is:

1. The process of preparing a dried fruit powder which consists in finely grinding the fresh fruit to form a fine pulp, spraying said pulp and then separating the same into minute particles and then rapidly drying said particles to form a powder.

2. The process of preparing a dried fruit powder which consists in crushing the fruit and separating the seeds therefrom, grinding the fruit to a very fine pulp, spraying said pulp in a shower at high velocity, separating said pulp into minute particles while in said shower and rapidly drying said separated particles to form a dry powdered substance.

3. The process of preparing dried fruit which consists in grinding the fresh fruit to a fine pulp, spraying said pulp in a shower and separating the pulp into minute particles in a hot drying medium and rapidly drying said separated particles while in transit in said medium.

4. The process of producing a dried fruit product which consists in grinding the fruit to a fine pulp, spraying said pulp in a shower, directing a disintegrating gaseous material through said shower at high velocity to separate the pulp into minute particles, and rapidly drying said separated particles in a hot drying medium to form a dry powdered material.

5. The process of producing a dry grape powder which consists in finely grinding the grape pulp and hulls, spraying said ground material in a shower, separating said material while in transit into minute particles, and rapidly drying said separated particles to form a dry powdered material.

6. The process of producing a dried grape product which consists in separating the seeds from the pulp and the hulls of the grapes, grinding the pulp and hulls to a fine condition, spraying said ground material in a shower and then separating the same into minute particles in a heated drying medium, and rapidly drying said particles while in transit in said medium.

7. The process of producing a dried grape powder which consists in grinding the skins and pulp of the grapes to a fine condition, spraying said ground material in a shower in a heated medium, passing a gaseous medium through said shower at high velocity to separate the said material into minute particles and drying said pulp in said medium while in transit therethrough.

8. The process of producing a dry grape powder which consists in grinding the fresh grapes and the hulls thereof to a fine pulp, spraying said material in an umbrella-like shower, directing a blast of highly heated gaseous medium at high velocity through said shower to separate said material into minute particles, and rapidly drying said separated particles in a hot drying medium.

9. The process of producing a dried grape product which consists in separating the seeds from the pulp and hulls of the grapes, grinding said pulp and hulls into a fine condition, centrifugally spraying said finely ground material in a shower in a heated medium, directing a blast of highly heated steam through said shower to separate said material into minute particles, and drying said separated particles while in transit through said heated medium.

In testimony whereof I affix my signature.

JOHN M. MacLACHLAN.